US008616716B2

(12) United States Patent
Zheng

(10) Patent No.: US 8,616,716 B2
(45) Date of Patent: Dec. 31, 2013

(54) LED DISPLAY SCREEN ASSEMBLED FROM THE FRONT

(76) Inventor: Zhongliang Zheng, Hangzhou (CN)

( * ) Notice: Subject to any disclaimer, the term of this patent is extended or adjusted under 35 U.S.C. 154(b) by 1105 days.

(21) Appl. No.: 12/582,700

(22) Filed: Oct. 20, 2009

(65) Prior Publication Data

US 2011/0090138 A1 Apr. 21, 2011

(51) Int. Cl.

| | |
|---|---|
| ***F21V 21/00*** | (2006.01) |
| ***F21V 17/00*** | (2006.01) |
| ***F21V 1/00*** | (2006.01) |
| ***H04N 5/64*** | (2006.01) |

(52) U.S. Cl.
USPC .................... 362/97.1; 362/97.2; 362/249.02; 362/382; 348/725; 348/794

(58) Field of Classification Search
USPC ............. 362/97.1–97.4, 382, 249.01, 249.02; 348/725, 794
See application file for complete search history.

(56) References Cited

U.S. PATENT DOCUMENTS

| | | | | |
|---|---|---|---|---|
| 5,390,093 | A * | 2/1995 | Himeno et al. | 362/249.06 |
| 7,671,936 | B2 * | 3/2010 | Chang | 362/97.2 |
| 8,362,696 | B2 * | 1/2013 | Zheng | 362/249.02 |
| 2009/0207334 | A1 * | 8/2009 | Kim et al. | 362/97.2 |
| 2009/0237916 | A1 * | 9/2009 | Park | 362/97.1 |
| 2012/0327633 | A1 * | 12/2012 | Jang | 362/97.1 |
| 2013/0093959 | A1 * | 4/2013 | Yokawa et al. | 348/725 |

* cited by examiner

*Primary Examiner* — Mariceli Santiago

(57) ABSTRACT

A LED display screen includes a case, a LED display module and a front assembling system. The case has a front opening. The LED display module is received in the case via the front opening, including a supporting base, a LED display unit mounting in front of the supporting base, and a LED shade shading in front of the LED display unit. The front assembling system has a base channel, a display unit channel and a shade channel. The front assembling system includes a still member, a supporting member and a supporting member. The still member mounts behind the supporting base. The supporting member is provided on the case. The supporting member includes a body and a head. The body is inserted through the mounting hole to engage with the supporting member. The head is hidden inside the base channel to combine the LED display unit with the supporting base.

20 Claims, 4 Drawing Sheets

LED DISPLAY SCREEN ASSEMBLED FROM THE FRONT

BACKGROUND OF THE PRESENT INVENTION

1. Field of Invention

The present invention relates to a LED display screen, and more particularly to a LED display screen which is conveniently assembled from the front.

2. Description of Related Arts

It is a time of information and attention. As an efficient medium to transfer information and idea to people, LED display screens are widely used in many circumstances. We can see LED display screen in streets, on buses, in stadium, and even in toilet. Accordingly, assembling LED display screens becomes a usual and important task.

A LED display screen comprises a LED display module and a case. To avoid shading the LED display module, the LED display module is ordinarily connected with the case with its back, and the connecting means is hidden behind. Traditionally, The LED display module has its back attached with the case, and the case has a back opening for operating. The LED display module and the case is then assembled by fastening a screw from the back of the LED display module via the back opening of the case. Finally, the back opening of the case is closed, and the LED display screen is mounted in a display position.

However, the LED display screen may be damaged or needs to be disassembled. In this case, people must take the whole LED display screen down, expose the back opening of the case and then loose the screw to detach the LED display module from the case. Besides, when assembling, the display effect of the LED display module can not be seen, so that it takes much time to adjust the LED display module.

LED display screens can be assembled and disassembled from the front are desirable. The major problem is that the connecting means will shade the LED display module to affect display effect. Frequently, the LED display screen is large and has a certain weight, if fastening it with screw, the screw will be thick and shade a rather big area of the LED display screen. When the LED display screen needs a plurality of screws, affection to the display effect is more serious. On another hand, if simply adhering the LED display module on the case, due to the weight of the LED display module, and the adhesive may go bad, it is not stable. Especially, in many situations, the LED display screen is placed high above, e.g., evenings and matches, so it is troublesome to take the whole LED display screen down to disassemble. The better way is to disassemble the LED display screen piece by piece and then take down.

SUMMARY OF THE PRESENT INVENTION

An object of the present invention is to provide a LED display screen, which is assembled from the front, comprising a LED display module and a case, in such a manner that the LED display module is assembled to the case with its back and is fastened from its front to form the LED display screen, the case can be fixed in a position first and the LED display module is assembled to the case later, therefore the LED display screen can be assembled easily and conveniently.

Another object of the present invention is to provide a LED display screen, which is assembled from the front, and the connecting means is hidden behind the LED display module, so that the affection to the display effect of the LED display module is reduced to a minimum level even the LED display module is assembled from the front. Therefore, the LED display screen is almost shadowless.

Another object of the present invention is to provide a LED display screen, which is assembled from the front, so that its display effect can be monitored when assembling, so as to avoid wasting time on checking and adjusting the LED display module again and again. Therefore, the LED display screen can be assembled quickly and precisely.

Another object of the present invention is to provide a LED display screen, which is waterproof, in such a manner that a PCB board and electric circuits of the LED display module are protected from the rain to avoid the rain runs into the interior of the LED display screen via the connecting means.

Another object of the present invention is to provide a LED display screen, wherein the LED display module can be detached from the case by a flipping over action, so as to reduce the force of detaching, facilitate assembling and disassembling, and fasten the LED display module and the case in a certain area.

Another object of the present invention is to provide a LED display screen, which does not involve complicated structure or high manufacture cost to achieve the above objects, so the LED display screen is especially adapted for industrial producing.

Accordingly, in order to accomplish the above objects, the present invention provides a LED display screen, comprising:

a case having a front opening;

a LED display module received in the case via the front opening, comprising a supporting base, a LED display unit mounting in front of the supporting base, and a LED shade shading in front of the LED display unit; and a front assembling system, having at least a base channel which is through the supporting base and has a first diameter, at least a display unit channel which is through the LED display unit, communicates with the base channel coaxially and has a second diameter smaller than the first diameter, and at least a shade channel which is through the LED shade, communicates with the display unit channel coaxially, and has the second diameter for a fastening tool to pass through the shade channel and the display unit channel, and comprising a still member mounting behind the supporting base and having a mounting hole which communicates with the base channel coaxially and has a third diameter smaller than the first diameter, a supporting member mounting on the case, and a movable member comprising a body which has the third diameter and is inserted through the mounting hole to engage with the supporting member, and a head which has a fourth diameter larger than the third diameter and smaller than the second diameter, is hidden inside the base channel.

Therefore, the fastening tool is inserted through the shade channel and the display unit channel into the base channel to fasten the movable member with the supporting member, so as to combine the LED display module with the case.

These and other objectives, features, and advantages of the present invention will become apparent from the following detailed description, the accompanying drawings, and the appended claims.

DETAILED DESCRIPTION OF THE PREFERRED EMBODIMENT

Figure 1:
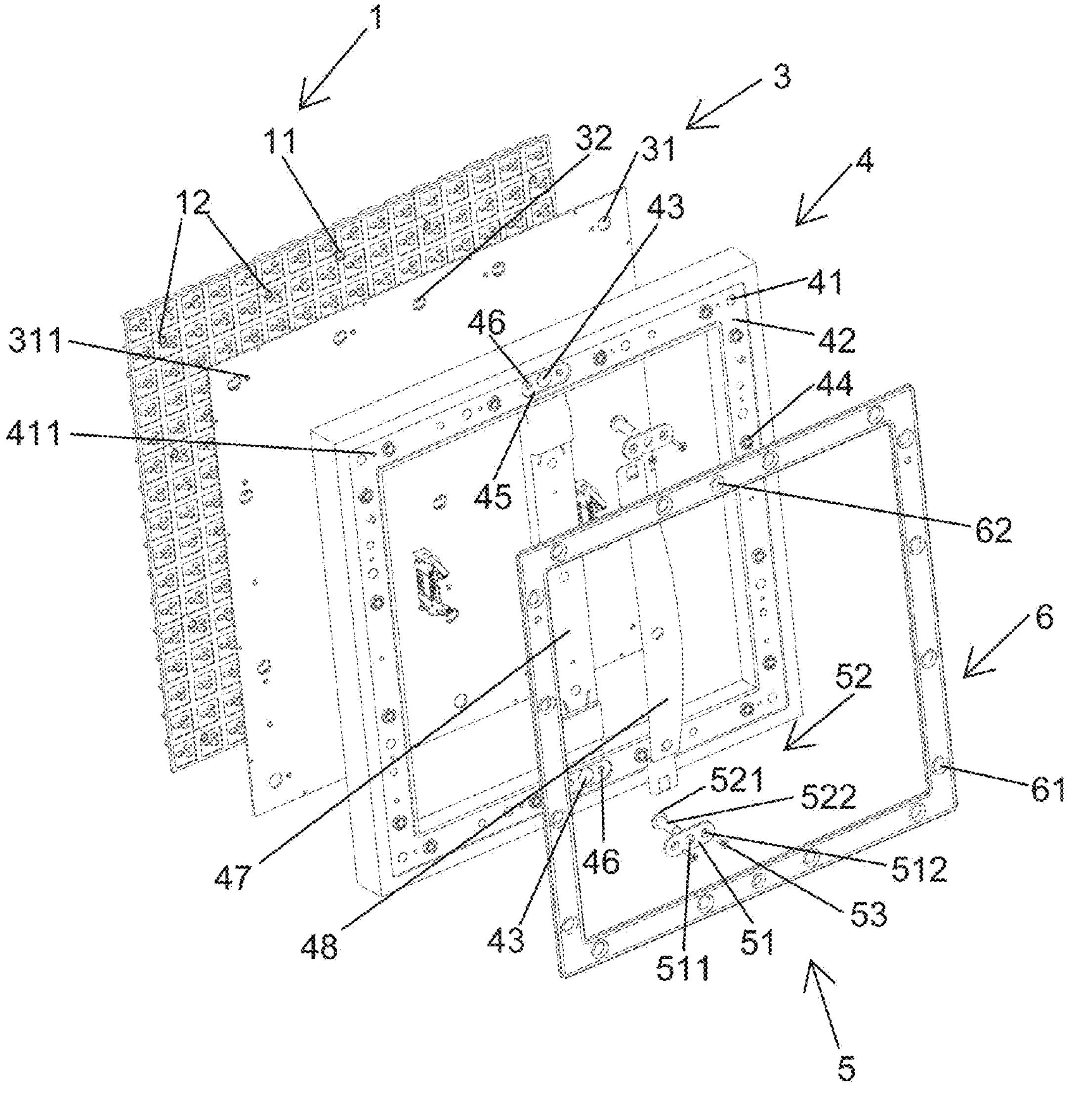
FIG. 1 is a exploded view of a LED display module according to a preferred embodiment of the present invention.
Figure 2:
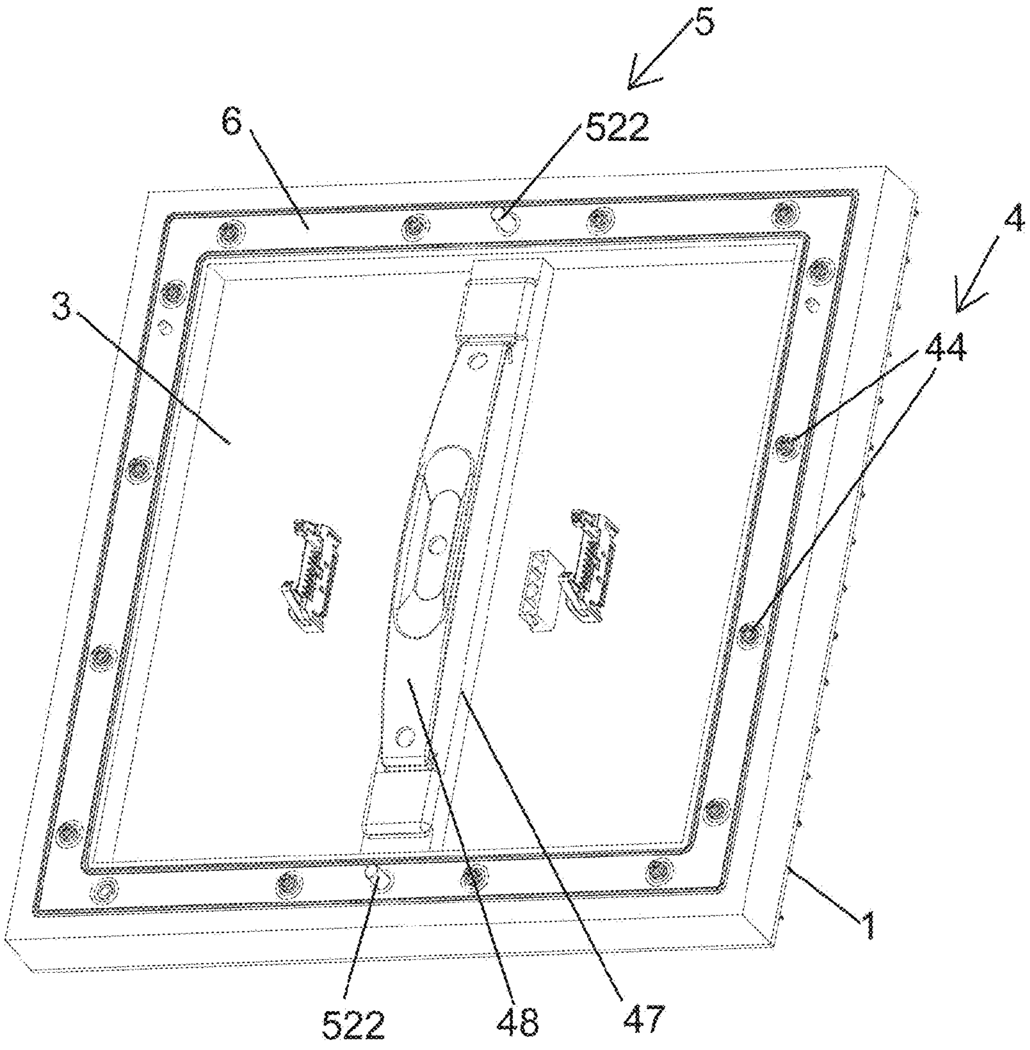
FIG. 2 is a back perspective view of the LED display module according to a preferred embodiment of the present invention.
Figure 3:
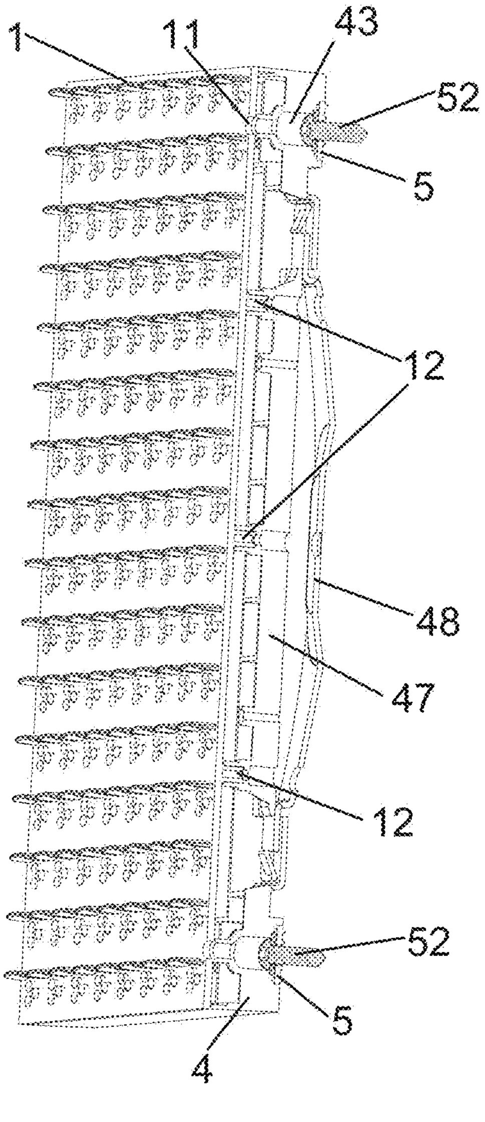
FIG. 3 is a sectional view of the LED display module according to a preferred embodiment of the present invention.
Figure 4:
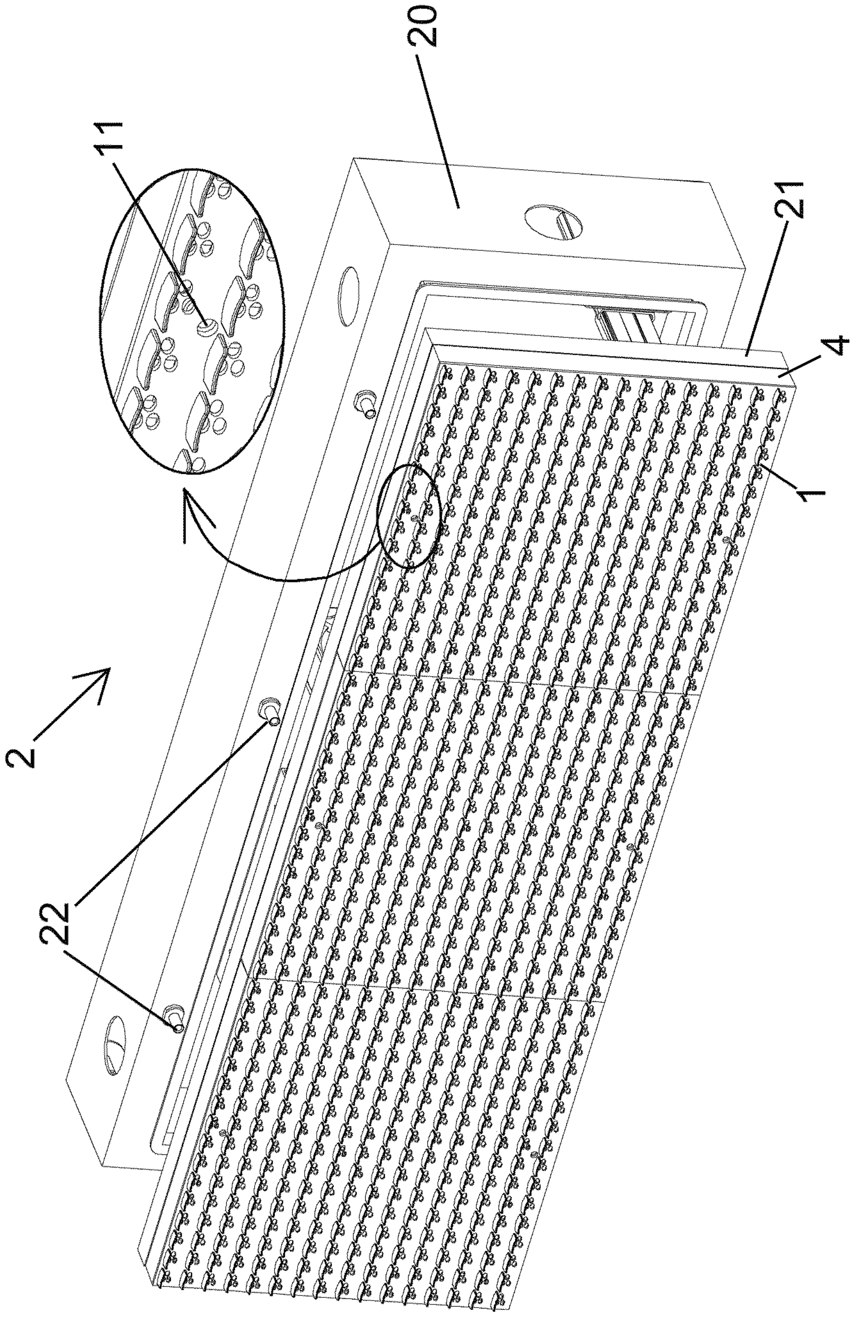
FIG. 4 is a perspective view of a LED display screen according to a preferred embodiment of the present invention.

Referring to FIG. 1-4 of the drawings, a LED display screen according to a preferred embodiment of the present invention is illustrated, comprising a case 2, a LED display module and a front assembling system 5.

The case 2 has a front opening.

The LED display module is received in the case 2 via the front opening, comprising a supporting base 4, a LED display unit 3 mounting in front of the supporting base 4, and a LED shade 1 shading in front of the LED display unit 3.

The front assembling system 5 has a base channel 43, a display unit channel 32 and a shade channel 12. The base channel 43 is through the supporting base 4, and has a first diameter. The display unit channel 32 is through the LED display unit 3, communicates coaxially with the base channel 43, and has a second diameter smaller than the first diameter. The shade channel 12 is through the LED shade 1, communicates coaxially with the display unit channel 32, and has the second diameter for a fastening tool to pass through the shade channel 12 and the display unit channel 32. The front assembling system 5 comprises a still member 51, a supporting member 22 and a supporting member 52. The still member 51 mounts behind the supporting base 4, and has a mounting hole 511 communicating with the base channel 43 coaxially and having a third diameter smaller than the first diameter. The supporting member 22 is provided on the case 2. The supporting member 52 comprises a body 522 and a head 521. The body 522 has the third diameter, and is inserted through the mounting hole 511 to engage with the supporting member 22. The head 521 has a fourth diameter larger than the third diameter and the second diameter, and smaller than first diameter, and is hidden inside the base channel 43 to combine the LED display unit 3 with the supporting base 4.

Accordingly, the fastening tool is inserted into the base channel 43 to fasten the supporting member 52 with the supporting member 22 via the shade channel 12 and the display unit channel 32, so as to combine the LED display module with the case 2.

Therefore, the front assembling system 5 is capable of assembling the LED display module from a front thereof. When assembling, the case 2 is first assembled in a position, then the supporting base 4, the LED display unit 3 and the LED shade 1 is mounted into the case 2 via the front opening of the case 2 in sequence, and at last the supporting member 52 is fastened with the fastening tool from the front of the LED display screen. The operation is easy and convenient. Besides, people is capable of monitoring a display effect of the LED display screen when assembling, so as to avoid adjusting or even reassembling the LED display screen as assembling from a back thereof. If the LED display screen is damaged or needs to be delivered to other places, the front assembling system 5 provides much convenience. Especially when the LED display screen is placed high, it is heavy to lift the whole LED display screen at a time. The LED display screen according to the present invention is capable of being assembled or disassembled piece by piece, and therefore is safe. Additionally, most of the assembling system is hidden inside the LED display screen, only a tiny opening of the shade channel 12 is exposed for the fastening tool to pass through. Therefore, an affection to the display effect of the LED display screen is reduced to a minimum level, besides, rain or dust can not enters the opening easily.

Preferably, the supporting member 52 could be a nail or a screw, the fastening tool could be a screwdriver, and the supporting member 22 has a corresponding structure to engage with the supporting member 52. To combine the LED display module with the case 2 firmly, the supporting member 52 may be thick, but the shade channel 12 and the display unit channel 32 keep the second diameter for permitting only the fastening tool to pass through, so that the LED display screen is shaded in a minimum level.

The front assembling system 5 may be multiple, and provided along an edge portion and a central portion of the LED display screen, so as to enhance fastening effect. Preferably, the front assembling system 5 is provided evenly along an the edge portion of the LED display screen to form a fastening circle.

According to the present invention, the still member 51 has a non-circular shape. The front assembling system 5 has a mounting groove 45 provided behind the supporting base 4 and on the base channel 43. The mounting groove 45 has corresponding shape for fittedly receiving the still member 51. Therefore the still member 51 will not turn or move in the mounting groove 45.

Preferably, the still member 51 has a plurality of first fixing holes 512, the supporting base 4 has a plurality of corresponding second fixing holes 46 provided in the mounting groove 45, and the front assembling system 5 further comprises a plurality of corresponding fixing elements 53 for being respectively inserted into the first fixing holes 512 and the second fixing holes 46 to fix the still member 51 on the supporting base 4. Therefore, when fastening the supporting member 52, the still member 51 will not move or turn, so as to enhance stability and reliability of the LED display. Additionally, the still member 51 is hidden in the supporting base 4 to provide a flat back thereof.

The front assembling system 5 further comprises a plurality of fastening elements 44 provided behind the supporting base 4 and evenly along an edge portion thereof for fastening the LED display module with the case 2.

Preferably, the front assembling system 5 further comprises a waterproof layer 6, and has a sealing groove 42 provided behind the supporting base 4 and along the edge portion thereof for receiving the waterproof layer 6 therein to form a sealing circuit. The mounting groove 45 and the fastening elements 44 are in the sealing groove 42. The waterproof layer 6 has a corresponding first through hole 62 and a plurality of corresponding second through holes 61 for the body 522 and the fastening elements 44 to extend out and connect with the case 2.

The front assembling system 5 further comprises a plurality of connecting elements 12 provided on a back of the LED shade 1, and has a plurality of corresponding base holes 411 through the supporting base 4, and a plurality of corresponding display unit holes 311 through the LED display unit 3. The connecting elements 12 are inserted into the base holes 411 and the display unit holes 311 to combine the LED shade 1, the LED display unit 3 and the supporting base 4 together. Therefore, the LED display screen can be assembled piece by piece, and then combined by fastening the supporting member 52.

The LED display module further comprises a bridge 47 extending transversely in a middle portion of the supporting base 4 for strengthening the supporting base 4 to prevent from being damaged. Further, the LED display module further comprises a handle 48 having two ends extending respectively from two ends of the bridge 47 for people to carry.

The case 2 comprises a case body 20 and a flipping board 21 for mounting the LED display module thereon. The flipping board 21 has a bottom rotatably and detachably connecting with the case 2. The supporting member 22 is mounted on an upper portion of the flipping board 21. The fastening elements 44 are mounted on the flipping board 21. Therefore, when disassembling the supporting member 52 from the supporting member 22, the LED display screen can be flipped over and taken down.

Preferably, the supporting base 4 is made of plastic to reduce a weight thereof and resist rust.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A LED display screen, comprising:

a case having a front opening;

a LED display module received in said case via said front opening, comprising a supporting base, a LED display unit mounting in front of said supporting base, and a LED shade shading in front of said LED display unit; and a front assembling system, having at least a base channel which is through said supporting base and has a first diameter, at least a display unit channel which is through said LED display unit, communicates with said base channel coaxially and has a second diameter smaller than said first diameter, and at least a shade channel which is through said LED shade, communicates with said display unit channel coaxially, and has said second diameter for a fastening tool to pass through said shade channel and said display unit channel, and comprising a still member mounting behind said supporting base and having a mounting hole which communicates with said base channel coaxially and has a third diameter smaller than said first diameter, a supporting member mounting on said case, and a movable member comprising a body which has said third diameter and is inserted through said mounting hole to engage with said supporting member, and a head which has a fourth diameter larger than said third diameter and said second diameter, and smaller than said first diameter, and is hidden inside said base channel.

2. The LED display screen, as recited in claim 1, wherein said still member has a non-circular shape, said front assembling system has a mounting groove provided behind said supporting base and on said base channel, said mounting groove has corresponding shape for fittedly receiving said still member.

3. The LED display screen, as recited in claim 2, wherein said still member has a plurality of first fixing holes, said supporting base has a plurality of corresponding second fixing holes provided in said mounting groove, and said front assembling system further comprises a plurality of corresponding fixing elements for being respectively inserted into said first fixing holes and said second fixing holes to fix said still member on said supporting base.

4. The LED display screen, as recited in claim 3, wherein said front assembling system further comprises a plurality of fastening elements provided behind said supporting base and evenly along an edge portion thereof for fastening said LED display module with said case.

5. The LED display screen, as recited in claim 3, wherein said front assembling system further comprises a waterproof layer, and has a sealing groove provided behind said supporting base and along said edge portion thereof for receiving said water proof layer therein to form a sealing circuit, said mounting groove and said fastening elements are in said sealing groove, said waterproof layer has a corresponding first through hole and a plurality of corresponding second through holes for said body and said fastening elements to extend out and connect with said case.

6. The LED display screen, as recited in claim 4, wherein said front assembling system further comprises a waterproof layer, and has a sealing groove provided behind said supporting base and along said edge portion thereof for receiving said water proof layer therein to form a sealing circuit, said mounting groove and said fastening elements are in said sealing groove, said waterproof layer has a plurality of corresponding through holes for said body and said fastening elements to extend out and connect with said case.

7. The LED display screen, as recited in claim 3, wherein said front assembling system further comprises a plurality of connecting elements provided on a back of said LED shade, and has a plurality of corresponding base holes through said supporting base, and a plurality of corresponding display unit holes through said LED display unit, said connecting elements are inserted into said base holes and said display unit holes to combine said LED shade, said LED display unit and said supporting base together.

8. The LED display screen, as recited in claim 4, wherein said front assembling system further comprises a plurality of connecting elements provided on a back of said LED shade, and has a plurality of corresponding base holes through said supporting base, and a plurality of corresponding display unit holes through said LED display unit, said connecting elements are inserted into said base holes and said display unit holes to combine said LED shade, said LED display unit and said supporting base together.

9. The LED display screen, as recited in claim 6, wherein said front assembling system further comprises a plurality of connecting elements provided on a back of said LED shade, and has a plurality of corresponding base holes through said supporting base, and a plurality of corresponding display unit holes through said LED display unit, said connecting elements are inserted into said base holes and said display unit holes to combine said LED shade, said LED display unit and said supporting base together.

10. The LED display screen, as recited in claim 7, wherein said LED display module further comprises a bridge extending transversely in a middle portion of said supporting base for strengthening said supporting base to prevent from being damaged.

11. The LED display screen, as recited in claim 8, wherein said LED display module further comprises a bridge extending transversely in a middle portion of said supporting base for strengthening said supporting base to prevent from being damaged.

12. The LED display screen, as recited in claim 9, wherein said LED display module further comprises a bridge extending transversely in a middle portion of said supporting base for strengthening said supporting base to prevent from being damaged.

13. The LED display screen, as recited in claim 10, wherein said LED display module further comprises a handle having two ends extending respectively from two ends of said bridge for people to carry.

14. The LED display screen, as recited in claim 11, wherein said LED display module further comprises a handle having two ends extending respectively from two ends of said bridge for people to carry.

15. The LED display screen, as recited in claim 12, wherein said LED display module further comprises a handle having two ends extending respectively from two ends of said bridge for people to carry.

16. The LED display screen, as recited in claim 13, wherein said case comprises a case body and a flipping board for mounting said LED display module thereon, said flipping board has a bottom rotatably and detachably connecting with said case, said supporting member is mounted on an upper portion of said flipping board, said fastening elements are mounted on said flipping board.

17. The LED display screen, as recited in claim 14, wherein said case comprises a case body and a flipping board for mounting said LED display module thereon, said flipping board has a bottom rotatably and detachably connecting with said case, said supporting member is mounted on an upper portion of said flipping board, said fastening elements are mounted on said flipping board.

18. The LED display screen, as recited in claim 15, wherein said case comprises a case body and a flipping board for mounting said LED display module thereon, said flipping board has a bottom rotatably and detachably connecting with said case, said supporting member is mounted on an upper portion of said flipping board, said fastening elements are mounted on said flipping board.

19. The LED display screen, as recited in claim 16, wherein said supporting base is made of plastic to reduce a weight thereof and resist rust.

20. The LED display screen, as recited in claim 18, wherein said supporting base is made of plastic to reduce a weight thereof and resist rust.

* * * * *